United States Patent [19]

Henning

[11] 4,180,282
[45] Dec. 25, 1979

[54] FRONT MOUNTED GROUND SUPPORTED TRACTOR ATTACHMENT

[76] Inventor: James Henning, R.R. 1, Hennepin, Ill. 61327

[21] Appl. No.: 908,812

[22] Filed: May 24, 1978

Related U.S. Application Data

[63] Continuation-in-part of Ser. No. 712,099, Aug. 5, 1976, Pat. No. 4,106,795.

[51] Int. Cl.² .............................................. B60D 3/00
[52] U.S. Cl. .................................... 280/481; 172/277
[58] Field of Search ................... 280/481, 492, 460 R; 239/147, 172, 176; 172/800, 277, 807; 180/14 R; 37/DIG. 20

[56] References Cited

U.S. PATENT DOCUMENTS

| | | | |
|---|---|---|---|
| 1,234,788 | 7/1917 | Milner | 280/460 R |
| 2,980,443 | 4/1961 | Fina | 280/481 X |

Primary Examiner—John A. Pekar
Attorney, Agent, or Firm—Zarley, McKee, Thomte, Voorhees & Sease

[57] ABSTRACT

A front mounted ground supported tractor attachment, steerable with and pushed by the tractor, includes a portable frame supported on caster wheels and a drive linkage connected between the frame and tractor. The drive linkage is connected to the tractor for pivotal movement about a transverse axis and the frame is connected to the drive linkage by a swivel connection for pivotal movement about a longitudinal axis relative to the tractor. In one embodiment, the drive linkage engages the frame for transmitting the pushing force of the tractor to the frame substantially independently of the swivel connection and the caster wheels allow the frame to turn with the tractor as it is steered in the usual manner. Wear plates are carried on the engaged surfaces of the frame and drive linkage.

10 Claims, 18 Drawing Figures

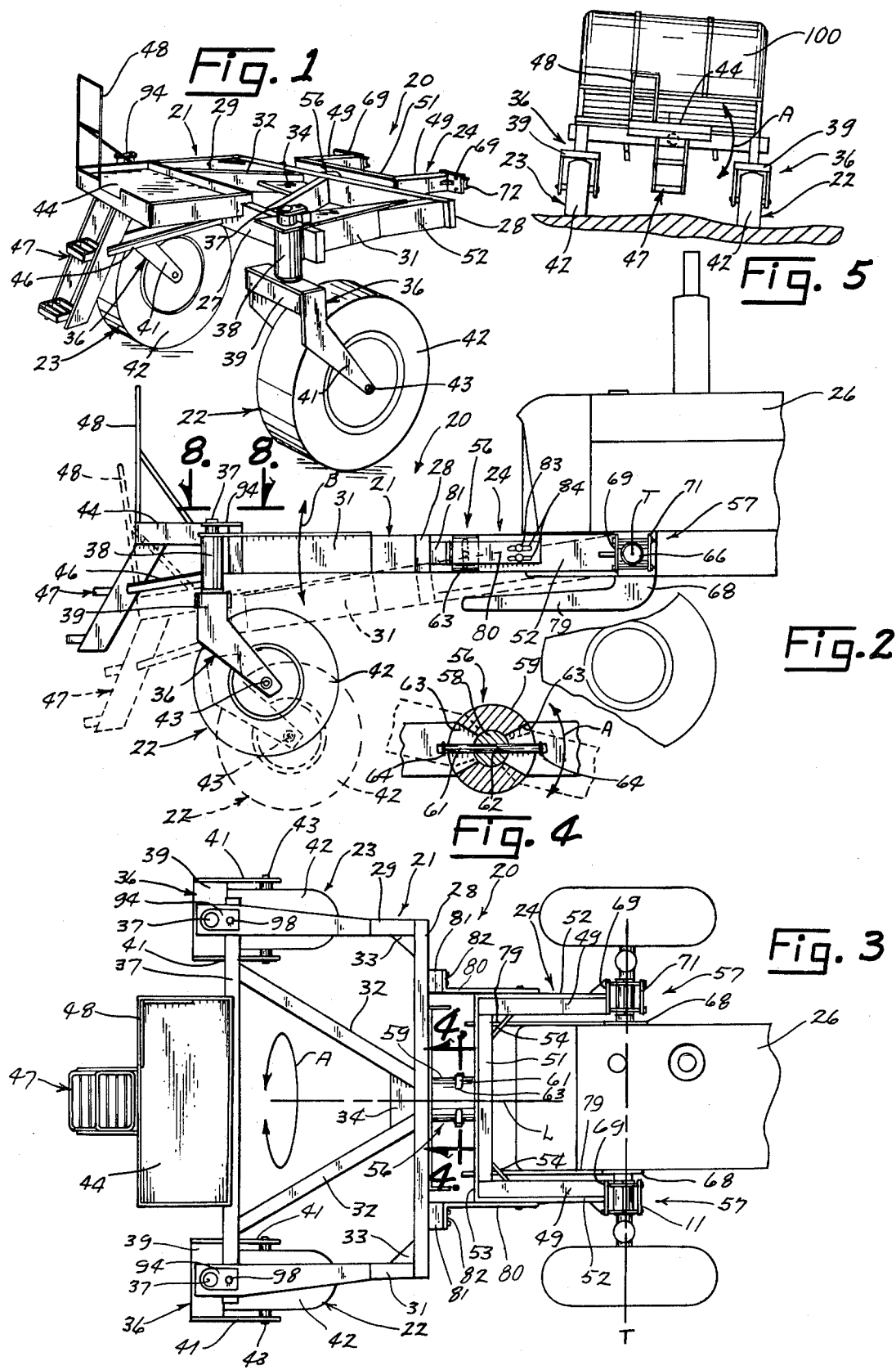

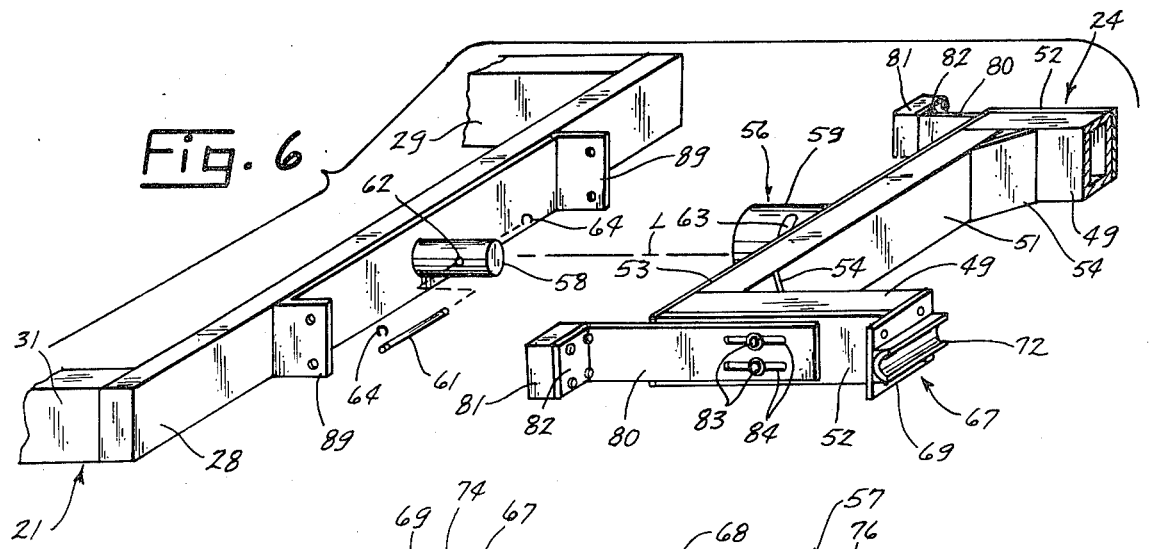
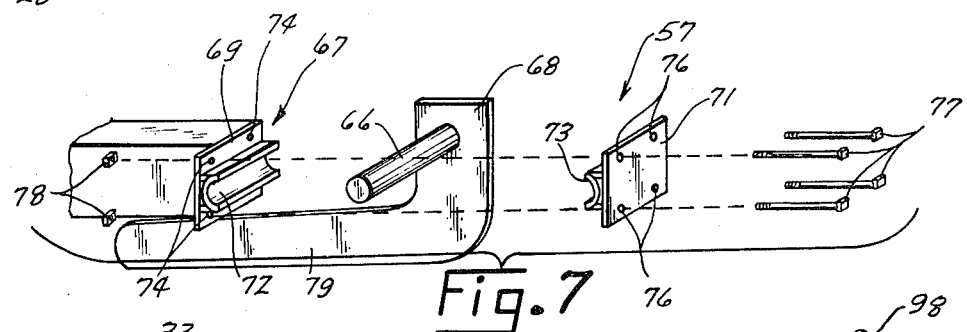
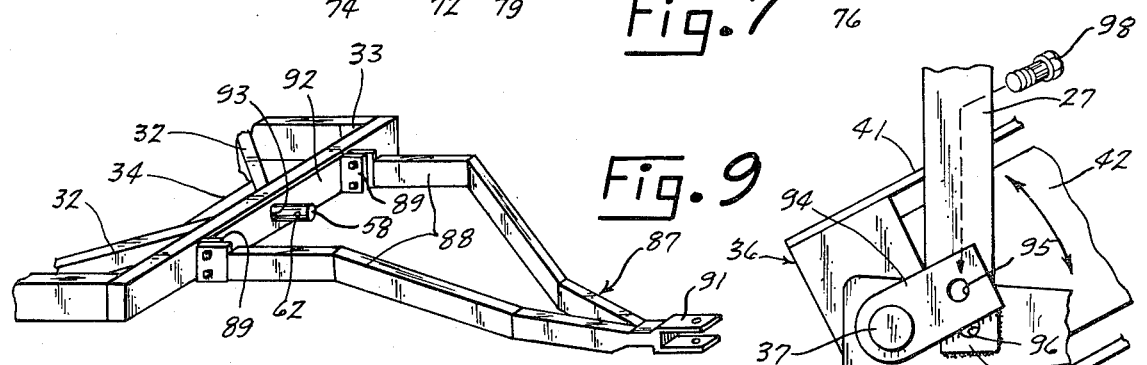
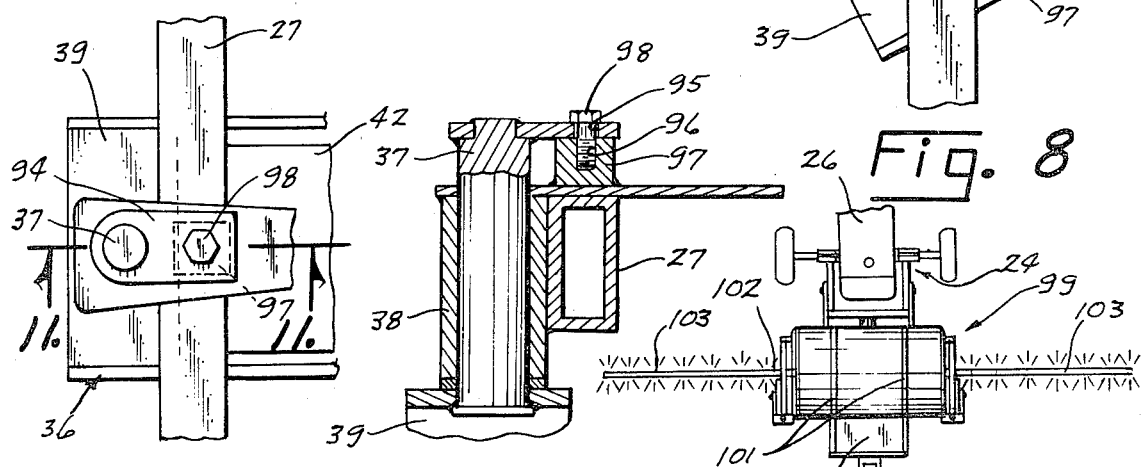

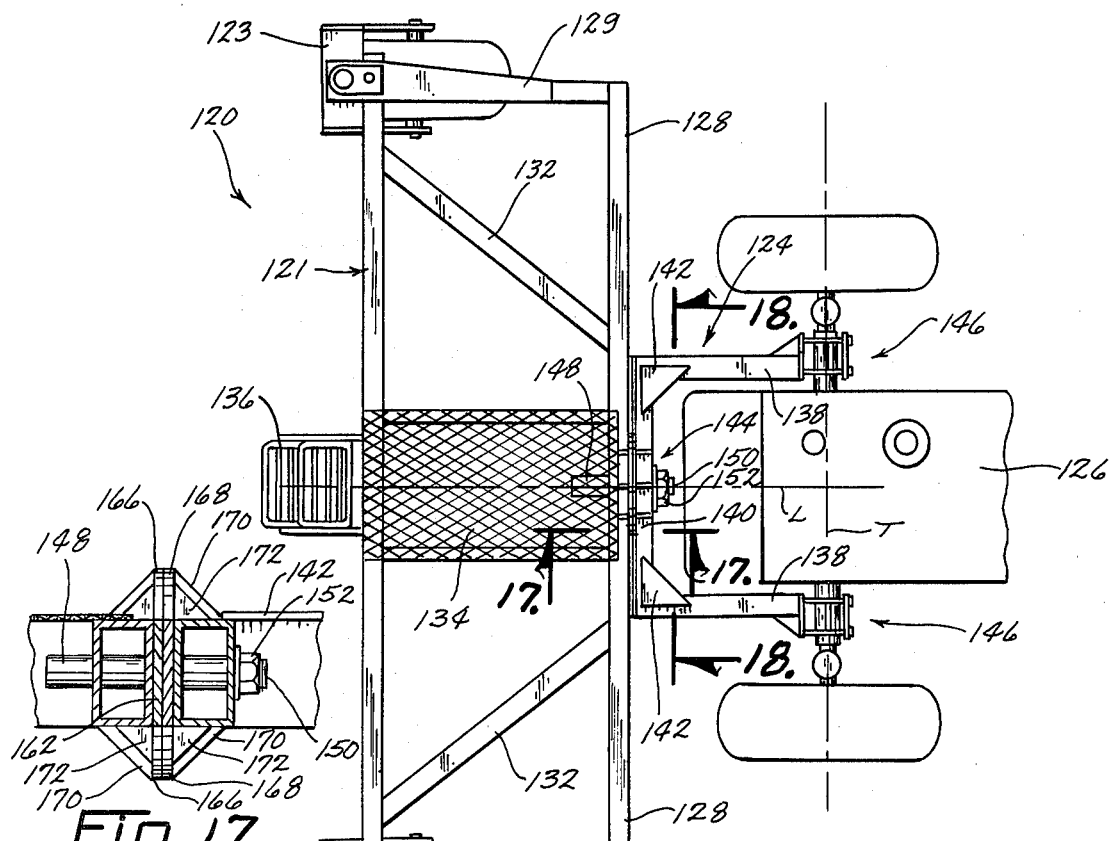
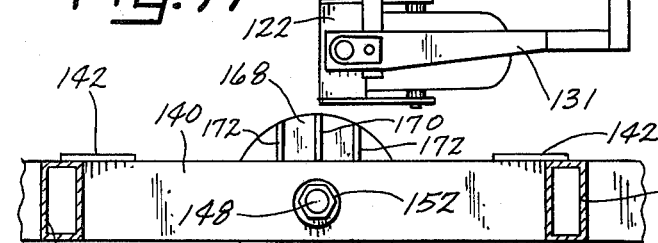
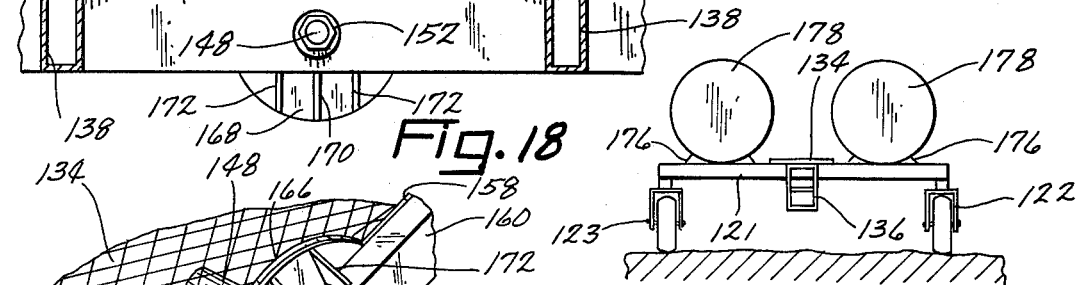
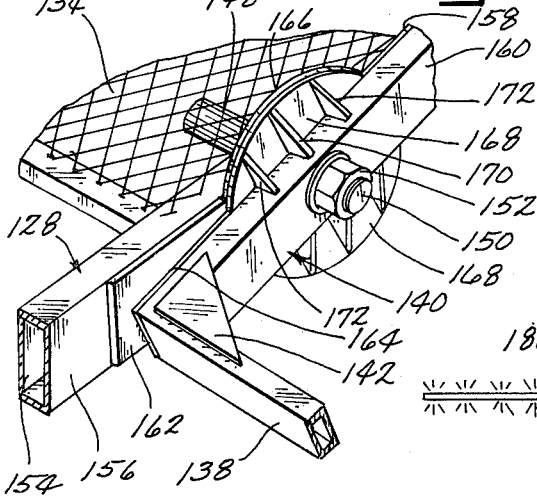
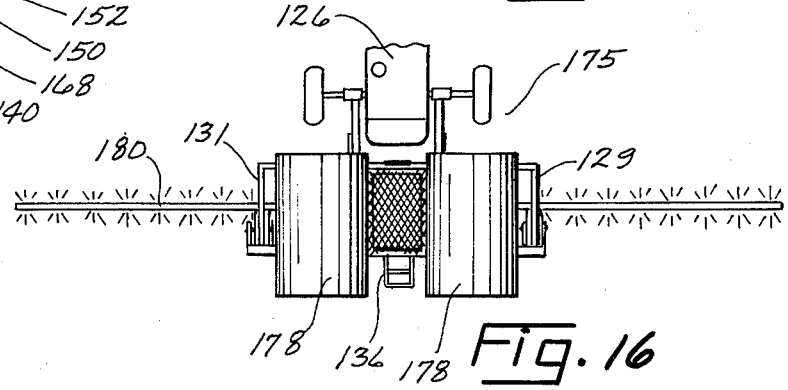

FRONT MOUNTED GROUND SUPPORTED TRACTOR ATTACHMENT

This application is a continuation-in-part of U.S. patent application, Ser. No. 712,099, filed Aug. 5, 1976, now U.S. Pat. No. 4,106,795.

SUMMARY OF THE INVENTION

The front mounted and ground supported tractor attachment of the present invention is of compact and rugged construction and effective to support a large load in front of and substantially free of the tractor itself. The portable frame, supported on a pair of caster wheels, is mounted in front of the tractor with freedom of pivotal movement about both a transverse and longitudinal axis so as to provide a substantially independent suspension means for the load on the push frame. Thus, while being steerable with the tractor, the frame is free to swivel and vertically pivot relative to the tractor so that the caster wheels remain in load bearing ground engagement regardless of irregularities in the terrain over which the tractor is driven. Because the load on the attachment is not carried on the tractor, a substantially heavy load may be transported as compared to the loads capable of being carried on conventional belly mounted or front-mounted tractor equipment. In this respect, the load on the attachment does not substantially increase soil compaction by the tractor wheels nor cause the tractor to exceed recommended weight limits. When equipped with a sprayer apparatus, the portable frame of the present invention is capable of supporting a larger tank than conventional tractor mounted units, thereby enabling the farmer to cover additional acres between tank refills.

Attachment and detachment of the push frame from the tractor is accomplished quickly and easily by a single pair of quick lock brackets, thereby minimizing tractor down time for installation. Because the push frame is so easily detached, it need not tie up a tractor to prevent its use for other operations.

In one embodiment of the invention, the drive linkage is engaged flush against the portable frame for transmitting the pushing force of the tractor directly to the frame. This arrangement substantially eliminates bending forces on the swivel connection between the frame and drive linkage in response to steering movements of the tractor. Wear plates are fixed onto the engaged surfaces of the frame and drive linkage to assure a long working life for the attachment.

BRIEF DESCRIPTION OF THE DRAWINGS

FIG. 1 is a perspective view of the front mounted tractor attachment of the present invention;

FIG. 2 is a longitudinal view of the tractor attachment in assembly relation with a tractor;

FIG. 3 is a plan view of the tractor and attachment of FIG. 2;

FIG. 4 is a transverse sectional view of the swivel coupling between the frame and drive linkage, taken on line 4—4 in FIG. 3;

FIG. 5 is a transverse front view of the tractor attachment with a large sprayer tank supported thereon;

FIG. 6 is a perspective view of the swivel coupling between the frame and drive yoke member;

FIG. 7 is a perspective view of one of the vertically pivotal couplings between the drive linkage and tractor;

FIG. 8 is a plan view of the axle locking mechanism for one of the caster wheels looking in the direction of line 8—8 in FIG. 2;

FIG. 9 is a perspective view of the frame with a rear hitch assembly substituted for the drive linkage;

FIG. 10 is a plan view of the axle locking mechanism, similar to FIG. 8, with the caster wheels locked in a straight ahead position;

FIG. 11 is a longitudinal sectional view of the caster wheel axle locking mechanism taken along line 11—11 in FIG. 10;

FIG. 12 is a plan view of the tractor attachment in assembly relation with a tractor and operatively supporting a sprayer apparatus;

FIG. 13 is a plan view of another embodiment of the tractor attachment in assembly relation with a tractor;

FIG. 14 is a fragmentary detail perspective view showing the pivotal sliding engagement between the frame and drive linkage;

FIG. 15 is a transverse front view of the tractor attachment with a pair of large sprayer tanks supported thereon;

FIG. 16 is a plan view of the tractor attachment in assembly relation with a tractor and operatively supporting a sprayer apparatus.

FIG. 17 is an enlarged detail sectional view taken on line 17—17 in FIG. 13; and FIG. 18 is an enlarged detail sectional view showing the arcuate wear plate extensions, as seen on line 18—18 in FIG. 13.

DESCRIPTION OF THE PREFERRED EMBODIMENT

Referring to FIG. 1, the front mounted tractor attachment, indicated generally at 20, includes a portable frame 21 which is supported on a pair of transversely spaced caster wheel assemblies 22 and 23. A drive linkage 24 connects the frame to the tractor for pivotal movement of the frame about both a transverse and longitudinal axis relative to the tractor. More specifically, when the attachment 20 is connected to a tractor 26, as shown in FIG. 3, it is steerable with and pushed by the tractor 26, while at the same time being free to swivel about a longitudinal axis, indicated by line L and pivot up and down about a transverse axis, indicated by line T.

The portable frame 21, shown best in FIGS. 1 and 3, includes a rectangular structure of rectangle section tubing including a front frame member 27, a rear frame member 28, and a pair of frame side members 29 and 31. Longitudinal reinforcement for the frame 21 is provided by a pair of forwardly diverging brace members 32. Rear corner gussets 33 and a brace member gusset 34 are secured in the positions shown in FIG. 3 to further strengthen the portable frame 21.

The caster wheel assemblies 22 and 23 are supported on the frame 21 at transversely spaced positions relative to the tractor 26, as shown in FIGS. 1 and 3. Because both caster wheel assemblies 22 and 23 are alike, only one of them will be described in detail with like numbers referring to like parts. Each caster wheel assembly includes a fork member 36 (FIG. 1) having an upright stub shaft 37 pivotally received within a caster wheel bearing sleeve 38 on the front frame member 27. The lower portion of the fork member 36 is an inverted U-shaped member 39 having opposite legs 41 between which a ground wheel 42 is rotatably supported on a wheel shaft 43. The legs 41 are inclined relative to the axis of the stub shaft 37 to position the center of the ground wheel 42 behind the stub shaft 37, thereby providing the caster effect for rotation of the caster wheel assembly within the bearing sleeve 38 in response to steering movement of the tractor 26.

A horizontal landing 44 (FIG. 1) is also supported on the front frame member 27 between the caster wheel assemblies 22 and 23 to provide access by an operator to a load carried on the frame 21. The front of the landing 44 is supported by a pair of support rods 46 connected at one end to the frame front member 27 and at the other end to a ladder like structure 47 suspended from the front of the landing 44 for climbing onto the landing. An upright railing 48 is secured at the front of the landing 44 for the operator's safety.

The drive linkage 24, which connects the portable frame 21 to the tractor 26 as shown in FIGS. 3 and 6, is a U-shaped member including a pair of elongated transversely spaced leg members 49 and a transverse drive linkage cross member 51 extended between and connected to front end portions of the legs 49. The exterior surfaces of the drive linkage legs 49 and cross member 51 are reinforced by respective face plates 52 and 53 welded thereon. Likewise, a pair of upright gusset plates 54 are secured across the inside corners where the legs 49 meet the cross member 51 to rigidify the connection between them.

The connections between the portable frame 21 and tractor 26 include first coacting means 56 on the frame 21 and drive linkage 24 which provides for pivotal movement of the frame 21 about the longitudinal axis L and second coacting means 57 on the drive linkage 24 and tractor 26 which provides for up and down pivotal movement of the frame 21 about the transverse axis T.

The first coacting means 56 is a swivel coupling, shown in unassembled form in FIG. 6 as including a longitudinally extended pivot shaft 58 on the rear frame member 28 and a longitudinally extended cylindrical sleeve 59 on the front of the drive linkage cross member 51 for pivotally receiving the pivot shaft 58 in axial alignment within it. To fix the pivot shaft 58 longitudinally within the cylindrical sleeve 59, thereby preventing its withdrawal, a locking pin 61 is insertable through a hole 62 extended transversely through the pivot shaft 58 when the hole 62 is longitudinally aligned between a pair of vertical slots 63 in opposite sides of the cylindrical sleeve 59. Thus, the opposite ends of the locking pin 61 are slidably engageable within the vertical slots 63 to provide limited pivotal or swivel movement of the pivot shaft 58 about axis L. Snap rings 64 or other suitable fasteners are applied onto the ends of the locking pin 61 to prevent its accidental withdrawal from the swivel coupling 56.

The second coacting means 57 between the drive linkage 24 and tractor 26 is shown in FIG. 3 as including a pair of push pins 66 adopted to be mounted in axial alignment on opposite sides of the tractor 26 and a pair of quick lock brackets 67 on the terminal ends of the drive linkage leg members 49. Since the quick lock brackets 67 are both the same, only one is described in detail and shown in FIG. 7, with like numbers referring to like parts.

The push pin 66 (FIG. 7) has affixed to one end a mounting plate 68 which is inclined perpendicular to the axis of the push pin 66. Plate 68 is adapted to be secured to the frame of the tractor 26 for transmitting the pushing force of the tractor to attachment 20 through the push pins 66.

Each quick lock bracket 67 (FIG. 7) includes a pair of upright plates 69 and 71, each having a respective half sleeve member 72 and 73 secured transversely across one side of the plate. Above and below the half sleeve members 72 and 73, the plates are provided with respective bolt holes 74 and 76 through which the bolts 77 are extended to lock the plates together with the push pin 66 in bearing engagement between the half sleeve members 72 and 73. Whereas the ends of the outer bolts 77 are accessible for applying a pair of nuts 78, the inner holes of plates 69 are threaded to receive the inner bolts 77 because these holes are covered by the drive linkage legs 49. The bearing surfaces of the half sleeve members 72 and 73 are greased to prevent wear and reduce friction with the push pins 66.

Thus, all that is required to connect the tractor attachment 20 to a tractor 26 equipped with the push pins 66, is to fasten the two quick lock brackets 67 onto the respective push pins 66. When thus connected, the first coacting means or swivel coupling 56 provides for pivotal movement of the frame 21, as indicated by arrow A in FIGS. 3, 4 and 5, about longitudinal axis L and the second coacting means 57, including the quick lock brackets 67, provides for pivotal movement of the frame 21, as indicated by arrow B in FIG. 2, about transverse axis T.

It can be seen in FIG. 7 that each push pin mounting plate 68 includes a lower portion or safety bar 70 which protrudes forwardly of the tractor for limiting the downward pivotal movement of the frame 21. When the tractor attachment 20 pivots downwardly to the dotted line position in FIG. 2, the drive linkage cross member 51 abuts against the forward ends of the safety bars 79. Thus, in the event that the tractor attachment 20 is inadvertently pushed into a deep ditch or the like, the tractor is prevented from running over the suspended attachment 20.

As thus far described, the pushing force of the tractor 26 is transmitted from the drive linkage 24 to the portable frame 21 entirely by means of the swivel coupling 56. To relieve the stress on the swivel coupling, a pair of push members 80 (FIG. 6) are connected to opposite sides of the drive linkage leg members 49. The push members protrude forwardly of the drive linkage 24 to engage the portable frame 21 at transversely spaced positions as indicated in FIG. 3. Thus, at least part of the pushing force of the tractor is transmitted to the frame 21 through the push members 80 when the tractor is driven straight ahead, and on turns, the push members 80 reduce the bending stress on the swivel coupling 56. It is important to note that the push members 80 simply abut against the portable frame 21 so as not to prevent swivel movement of the frame through the coupling 56. Because of the resultant frictional engagement with the frame 21, the push members 80 include a pair of wear plates 81 fastened to respective bent end portions 82 of the push members. The wear plates 81 are made of a soft material such as aluminum so as to prevent wear of the rear frame member 28. As the thickness of the wear plates 81 is reduced due to wear, the push member 79 must be adjusted longitudinally on the drive linkage in order to maintain engagement with the portable frame 21. Accordingly, the rear ends of the push members 80 are provided with a pair of parallel slots 84 through which a pair of bolts 83 are insertable for attachment to the drive linkage leg members 49, thereby forming a longitudinally adjustable connection to compensate for plate wear.

Because the tractor attachment 20 may be adapted for various uses, an operator may desire to pull the tractor attachment 20 behind his tractor for use as a trailer or the tool carrying portion of an implement. For such purposes, the drive linkage 24 is easily detached from the portable frame 21 upon the removal of the locking pin 61 of the swivel coupling 56. In place of the drive linkage 24, a tongue member 87 is fastened to the portable frame 21 for connecting it to the usual hitch bar on the back of a tractor. The tongue member 87 has a pair of elongated tubing members 88 connected at one end to respective tongue member brackets 89 on the frame 21 with the other ends converging downwardly and inwardly therefrom for connection to the clevis hitch connector 91. The tongue member brackets 89 are simply bent end portions of a reinforcing plate 92 which is welded onto the rear frame member 28. The plate 92 has a centrally located hole 93 which allows the plate to be fitted over the pivot shaft 58 which is thereby reinforced relative to the rear frame member 28.

It is also necessary to lock the caster wheel assemblies 22 and 23 in a straight ahead position in order to prevent the tractor attachment 20 from swaying from side to side behind a tractor to which it is connected by the tongue member 87. Accordingly, a rock arm 94 (FIGS. 8 and 11) is fixed on the upper end of each caster wheel stub shaft 37 for rotation therewith. A hole 95 is formed in a terminal end portion of the rock arm 94 and adapted to be alignable with a corresponding hole 96 in a rock arm bracket 97 secured to the frame 21 longitudinally behind the axis of the caster wheel stub shafts 37. Accordingly, when the caster wheel assemblies 22 and 23 are rotated on the stub shafts 37 to a position where the wheel shafts 43 are directed transversely of the frame 21, the holes 95 and 96 of the rock arm 94 and bracket 97 are aligned allowing the insertion of a bolt 98 to releasably lock the caster wheel assemblies in the straight ahead position.

Referring again to its primary intended use as a front mounted push type tractor attachment, the present invention is particularly suitable for use as a supporting structure of a sprayer implement, indicated generally at 99 in FIG. 12. For this purpose, a large tank 100 is supported on the portable frame 21 and secured in position by a pair of straps 101. An elongated spraying boom 102 is supported on the underside of the portable frame 21 behind the caster wheel assemblies 22 and 23 and has a pair of elongated extensions hingedly connected to opposite ends thereof to extend the length of the boom 102 when the extensions are lowered for spraying as shown in FIG. 12. The hydraulic pump (not shown) for the sprayer apparatus may similarly be supported on the underside of the frame directly behind the ladder-like structure 47 so as to be situated between rows of crops being sprayed. The sprayer implement 99 thus described is quickly and easily attached to and detached from the tractor since the only connections are the two quick lock brackets 67 of the drive linkage 24 and the hydraulic line (not shown) from the sprayer pump to the hydraulic system of the tractor.

Another embodiment of the invention is shown in FIGS. 13-16. Referring to FIG. 13, the front mounted tractor attachment, indicated generally at 120, includes a portable frame 121 which is supported on a pair of transversely spaced caster wheel assemblies 122 and 123. A drive linkage 124 connected the frame to the tractor 126 for pivotal movement of the frame about both a transverse and longitudinal axis relative to the tractor.

The portable frame 121 includes a rectangular structure of rectangle section tubing including a front frame member 127, a rear frame member 128, and a pair of frame side members 129 and 131. A pair of forwardly diverging brace members 132 extend between the front and rear frame members for greater structural integrity. The caster wheel assemblies are supported at the forward corners of the portable frame 121 as described in connection with the previous embodiment.

A horizontal landing 134 is extended longitudinally across the front and rear frame members 127 and 128 and transversely centered thereon to provide access by an operator to loads carried on either side of the frame 121. A ladder-like structure 136 is suspended from the front of the landing 134.

The drive linkage 124 is a U-shaped member including a pair of elongated transversely spaced leg members 138 and a transverse cross member 140 extended between and connected to front end portions of the legs 138. A pair of gusset plates 142 further rigidify the connection between the cross member 140 and leg members 138.

The connections between the portable frame 121 and tractor 126 include a swivel connection 144 between the frame 121 and drive linkage 124 which provides for pivotal movement of the frame 121 about the longitudinal axis L disposed centrally of the tractor 126 and a pivotal connection 146 between the drive linkage 124 and tractor 126 which provides for pivotal movement of the frame 121 about the transverse axis T.

The swivel connection 144 includes a longitudinally directed pivot shaft 148 centrally supported on the frame 121. As can be seen in FIGS. 13 and 14, pivot shaft 148 extends through the frame rear cross member 128 to which it is rigidly fixed by welding or the like. The drive linkage cross member 140 is provided with a central opening for pivotally receiving shaft 148. A rear portion 150 of shaft 148 is threaded and a lock nut 152 is secured thereon for longitudinally securing the drive linkage cross member 140 on the shaft 148.

It can be seen that the swivel connection 144 serves to operatively engage the drive linkage cross member 140 against the frame rear cross member 128. Since the drive linkage cross member 140 is slidably received on shaft 148, pushing force of the tractor is transmitted through the drive linkage directly against the frame rear cross member 128 substantially independently of the swivel connection 144. Accordingly, as the frame is forced laterally in response to steering movements of the tractor, the pivot shaft 148 is subjected to only tolerable sheer stresses with all bending stresses associated with turning movements being substantially eliminated.

Referring to FIG. 14, the frame rear cross member 128 has forward and rearward sides 154 and 156 respectively. Likewise, the drive linkage cross member 140 has forward and rearward sides 158 and 160 respectively. A first wear plate 162 is fixed onto the rearward side 156 of the frame cross member 128 and a second wear plate 164 is fixed onto the forward side 158 of the drive linkage cross member 140. Both wear plates have central openings to permit passage of the pivot shaft 148 therethrough. Swivel coupling 144 arranges the first and second wear plates 162 and 164 in flush engagement against one another. It can be seen in FIG. 14 that as the frame swivels relative to the drive linkage frictional sliding engagement occurs between the wear plates.

For this purpose, the wear plates may be formed of a suitable bearing material or engagement surfaces may be greased to reduce friction. The engagement surfaces of the wear plates in the embodiment shown are flat.

Referring to FIGS. 17 and 18, it can be seen that the frame wear plate 162 is provided with a pair of first extensions 166 which protrude vertically beyond the frame rear cross member 128. A corresponding pair of second extensions 168 protrude vertically from the drive linkage wear plate 164 for engagement in face-to-face relation against the first extensions 166. Each of the extensions 166 and 168 is reinforced by gussets 170 and 172. The outer peripheral edges of the extensions 166 and 168 are of an arcuate shape arranged in concentric relation to the longitudinal axis L. The extensions 166 and 168 thus cooperate with the wear plates 162 and 164 to define circular surfaces which remain in engagement at all rotational positions of the frame 122 relative to drive linkage 124.

The pivotal connection 146 between the drive linkage 124 and tractor 126 is substantially as described in connection with the embodiment of FIGS. 1-12.

The attachment 120 is also particularly suitable for use as a supporting structure of a spray implement, indicated generally at 175 in FIG. 16. It can be seen in FIG. 15 that the wide frame 121 may be provided with suitable saddle-shaped brackets 176 for supporting a pair of large tanks 178 on either side of the landing 134. An elongated spraying boom 180 is supported on the underside of the frame 121 in the manner previously described in connection with FIG. 12. Similarly, a hydraulic pump may be assembled onto the frame for pumping fluid from the tanks 178 to the booms 180 for spraying operations.

The modified embodiment of FIGS. 13-16 therefore provides direct pushing engagement between the drive linkage and frame to further distribute the pushing force along the rear frame member 128 and to substantially eliminate bending forces on the swivel connection during turning movements of the assembled tractor and attachment.

I claim:

1. A front mounted vehicle attachment steerable with and pushed by a vehicle comprising:
   a portable frame positionable forwardly of the vehicle,
   a pair of caster wheels,
   means for supporting the caster wheels on the frame at transversely spaced positions relative to the vehicle,
   a drive linkage between the frame and vehicle,
   means for providing a swivel connection between the drive linkage and frame for pivotal movement of the frame about a generally longitudinal axis relative to the vehicle, and
   means for providing a pivotal connection between the vehicle and drive linkage for pivotal movement of the frame about a generally transverse axis relative to the vehicle,
   said drive linkage being engaged against said portable frame whereby pushing force of the vehicle is transmitted to the portable frame by the drive linkage substantially independently of said swivel connection means, and
   said swivel connection means securing said frame and drive linkage in longitudinally spaced-apart relation for pivotal movement of the frame free of obstruction with said drive linkage.

2. The structure of claim 1 wherein said portable frame includes a rear cross member having an upright rear surface and said drive linkage includes a front cross member having an upright front surface, said front and rear surfaces being positioned in face-to-face engagement.

3. The structure of claim 1 wherein said portable frame includes a rear cross member having forward and rearward sides and a first wear plate secured to the said rearward side, and said drive linkage includes a front cross member having forward and rearward sides and a second wear plate secured to the forward side of said front cross member, said first and second wear plates arranged in flush engagement against one another.

4. The structure of claim 3 wherein said first and second wear plates include substantially flat engagement surfaces.

5. The structure of claim 1 wherein said swivel connection means comprises a longitudinally directed pivot shaft centrally supported on one of said frame and drive linkage, the other of said frame and drive linkage having an opening for pivotally receiving said pivot shaft and means for longitudinally securing the other of said frame and drive linkage on said pivot shaft.

6. The structure of claim 1 wherein said portable frame includes a landing substantially transversely centered thereon and extended longitudinally thereacross.

7. The structure of claim 1 wherein said portable frame includes front and rear cross members and a pair of opposite side members connected between said front and rear cross members, said members arranged in a common plane so as to define a load carrying platform.

8. A front mounted vehicle attachment steerable with and pushed by a vehicle comprising:
   a portable frame positionable forwardly of the vehicle,
   a pair of caster wheels,
   means for supporting the caster wheels on the frame at transversely spaced positions relative to the vehicle,
   a drive linkage between the frame and vehicle,
   means for providing a swivel connection between the drive linkage and frame for pivotal movement of the frame about a generally longitudinal axis relative to the vehicle, and
   means for providing a pivotal connection between the vehicle and drive linkage for pivotal movement of the frame about a generally transverse axis relative to the vehicle,
   said drive linkage being engaged against said portable frame whereby pushing force of the vehicle is transmitted to the portable frame by the drive linkage substantially independently of said swivel connection means,
   said portable frame including a rear cross member having forward and rearward sides and a first wear plate secured to the said rearward side, and said drive linkage includes a front cross member having forward and rearward sides and a second wear plate secured to the forward side of said front cross member, said first and second wear plates arranged in flush engagement against one another,
   said first and second wear plates including respective first and second extensions which protrude vertically beyond said rear cross member and front cross member respectively, said first and second extensions being positioned in face-to-face engagement.

9. The structure of claim 8 wherein said first and second extensions have arcuate peripheral edges disposed in concentric relation to said longitudinal axis.

10. The structure of claim 8 wherein said first extension includes a pair of first extensions protruding vertically from said rear cross member in opposite directions and said second extension includes a pair of second extensions protruding vertically from said front cross member in opposite directions.

* * * * *